(12) United States Patent
Lerner et al.

(10) Patent No.: US 9,571,554 B1
(45) Date of Patent: Feb. 14, 2017

(54) DIRECTED INTERACTION OF DEVICE

(71) Applicant: AMAZON TECHNOLOGIES, INC., Reno, NV (US)

(72) Inventors: David Mayr Lerner, Seattle, WA (US); Erik Joseph Miller, Seattle, WA (US); Sunil Kumar Garg, Seattle, WA (US); Marcus Albert Barry, Seattle, WA (US); Jon Robert Ducrou, Seattle, WA (US); Christopher Michael Brennan, Seattle, WA (US); Brandon John Smith, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 746 days.

(21) Appl. No.: 13/890,947

(22) Filed: May 9, 2013

(51) Int. Cl.
*G06F 15/177* (2006.01)
*H04L 29/08* (2006.01)
*G06F 15/16* (2006.01)

(52) U.S. Cl.
CPC ................... *H04L 67/02* (2013.01)

(58) Field of Classification Search
USPC ................................. 709/220, 204
See application file for complete search history.

(56) References Cited

U.S. PATENT DOCUMENTS

| | | | | |
|---|---|---|---|---|
| 2010/0036911 | A1* | 2/2010 | Sankaran | H04L 41/0813 709/204 |
| 2012/0231434 | A1* | 9/2012 | Standage | G09B 5/06 434/350 |
| 2014/0026128 | A1* | 1/2014 | Rocha De la hoz | G06Q 10/06 717/168 |

FOREIGN PATENT DOCUMENTS

WO    WO 2011022053 A1 *  2/2011  ......... G06F 21/6218

* cited by examiner

*Primary Examiner* — Hee Soo Kim
(74) *Attorney, Agent, or Firm* — Lindauer Law, PLLC

(57) ABSTRACT

Described are methods and systems of providing directed interaction from one or more presenter devices to one or more participant devices. Directed interaction allows one or more presenters to change application state, device settings, or both on the participant devices. Within the constraints imposed by the presenter device, the participant devices may be able to change content presentation, position, and so forth. The participant devices may also generate participant status data, which may be provided to the presenter devices.

20 Claims, 12 Drawing Sheets

PRESENTER DATA
126

APPLICATION CONFIGURATION
202

| APPLICATION IDENTIFIER 206 | STATE PARAMETER 208 | STATE SETTING 210 |
|---|---|---|
| Reader v.2 | Content.Location | 10493 |
| Dictionary v.1 | Return.Lookups | Enabled |
| Reader v.2 | Highlight.View | Enabled |
| Map v.4 | Set.Map.Focus | Seattle, WA |
| Map v.4 | Set.Map.Zoom | 2 to 5 |

⋮

DEVICE CONFIGURATION
204

| DEVICE PARAMETER 212 | DEVICE SETTING 214 |
|---|---|
| User.Task.Switching | Disabled |
| Participant.Mode | Enabled |
| Application.Open | Map |
| Policy.Expiration | 65 minutes |
| Speaker.Level | Low |
| Application.Install | "Hydraulic Simulator" |

DIRECTED INTERACTION OF DEVICE

BACKGROUND

Devices may be used to access content such as electronic books ("eBooks"), audio, video, applications, and so forth. This content may be used in situations including education, business, medicine, and so forth.

BRIEF DESCRIPTION OF DRAWINGS

FIG. 2 is a block diagram of the presenter data which may be used to direct interaction with content.

Figure 1:
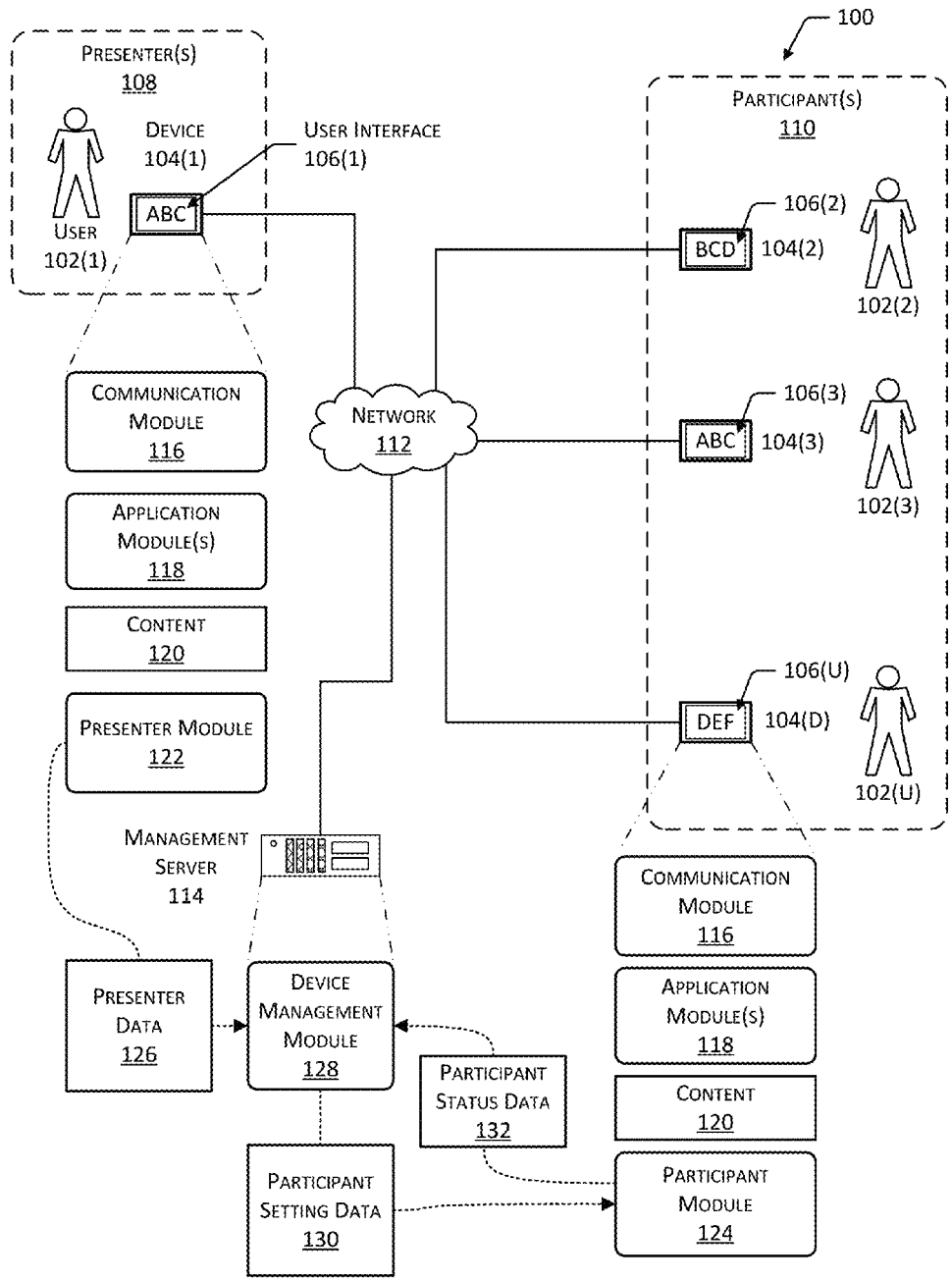
FIG. 1 is an illustrative system for providing directed interaction on devices by sending participant setting data to, and receiving participant status data from, the devices.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Applications and content such as eBooks, audio, video, web pages, and so forth may be accessed using a wide variety of devices. These devices may include televisions, tablet computers, smartphones, personal computers, electronic book ("eBook") readers, gaming consoles, set-top boxes, portable media players, and so forth.

These devices and the consumption of content may be used in situations such as education, business, and so forth. For example, while teaching a history class a teacher may wish to direct or guide the consumption of applications and content on the devices used by students.

Described in this disclosure are systems and techniques for providing directed interaction on one or more devices. A directed interaction allows one or more presenters to manage content presentation, device functionality, and so forth of the participant at different levels of granularity. This may be done by changing the application state, device settings, or both on a participant device. For example, during a directed interaction, a presenter may use a presenter device to generate presenter data which specifies a particular passage of text within a chapter for participants to consume. The participant devices receive participant setting data based on the presenter data and present the particular passage as specified. The presentation on the devices, even if the same content, may vary based on individual settings of the different participant devices. For example, the users of the different participant devices may have each configured their respective devices to present text using a particular font size, with a particular color, audibly, and so forth. Using directed interaction, the participating user retains some control over the participant device and may have control over how the content is presented. As a result, directed interaction enables a collaborative presentation of content.

The presenter devices and the participant devices may be the same or different. In one implementation all users may have similar tablet computers, while in another implementation some users may use smartphones while others use tablet computers of different makes and still others use laptops. A management server may be configured to receive from the presenter device the presenter data and generate participant setting data appropriate to configure the recipient devices. In some implementations, a peer-to-peer system may be used, where the presenter and participant devices work in conjunction with one another to provide directed interaction without the server.

Additionally, the roles of presenter and participant may vary during operation. For example, in a collaborative meeting, the designation and corresponding control capabilities of the presenter may be transferred or delegated to different users, such that one or more users may be a presenter, a participant, or both.

Illustrative System

FIG. 1 is an illustrative system 100 for providing directed interaction from one or more presenters to one or more participants. Users 102(1), 102(2), 102(3), . . . , 102(U) are shown. The users 102 may have access to one or more devices 104. These devices 104 may include tablet computers, personal computers, electronic book readers, gaming consoles, smartphones, wearable computing devices, and so forth. Each device 104 provides a user interface 106. The user interface 106 may be one or more of a character user interface, graphical user interface, audible user interface, haptic user interface, and so forth. The user interface 106 is configured to present information to the user 102, and may be configured to accept input from the user 102.

The devices 104, and their corresponding users 102, may be categorized as presenters 108 or participants 110. The one or more presenters 108 include users 102 who are leading a directed interaction. This direction may include specifying particular content or a portion thereof, providing application or device settings, and so forth. For example, the user 102(1) who is the presenter 108 may be a teacher, lecturer, chairperson, and so forth who is discussing material included in an eBook. The presenter 108 is able to place and implement constraints on the operation of the devices 104 of the participants 110. The one or more users 102 who are participants 110 thus find the operation of their respective devices 104 constrained. Continuing the example, the participant 110 user 102(2) may find that application switching is constrained such that during the directed interaction of the class the device 104(2) cannot switch from the eBook being discussed to a game.

For ease of discussion, the devices 104 used by the users 102 acting as presenters 108 are referred to as "presenter devices" while those used by the users 102 acting as participants 110 are referred to as "participant devices." For example, as shown in this illustration the device 104(1) is a presenter device, while the devices 104(2)-104(D) are participant devices. In some implementations, a particular user 102 and one or more devices 104 may be configured to operate as the presenter 108, the participant 110, or both, at a given time. For example, the user 102(1) acts as a presenter 108 to use the device 104(1) to send a state of the map application to another device 104(2), while receiving and implementing an internet browser application state. The devices 104 may be at one or more physical locations. For example, the devices 104(1)-(D) may all be within a single auditorium, or may be located in multiple homes.

The devices 104 may be connected to one or more networks 112. The networks 112 may include a wireless local area network ("WLAN"), cabled local area network ("LAN"), personal area networks ("PAN"), and so forth. In some implementations the network 112 may be ad-hoc, such as in a peer-to-peer arrangement, or may be structured such as with one or more access points mediating data transfer.

The network 112 may also be coupled to one or more other devices such as a management server 114. The management server 114 is configured to facilitate the directed interaction, and is discussed in more detail below.

Returning to the devices 104, each device 104 may include a communication module 116, one or more application modules 118, content 120, a presenter module 122, a participant module 124, and so forth. The communication module 116 is configured to support communication between the devices 104, the management server 114, and so forth using the network 112. The application modules 118 may include one or more of eBook readers, browsers, calculators, word processors, spreadsheets, slideshow presenters, and so forth. One or more of the application modules 118 may be configured to access content 120. The content 120 may include eBooks, audio, video, uniform resource locators ("URL"), uniform resource identifiers ("URI"), and so forth. For example, the content 120 may include an eBook about the history of Seattle as well as links to interactive websites containing maps of Seattle during different historical periods. The content 120 may have been received from another device 104, from a content distribution server, from the management server 114, or another device.

The presenter module 122 is configured to generate presenter data 126. The presenter module 122 may be configured to acquire information about the state of the device 104, the application modules 118 executing on the device 104, or both. Based on this information, the presenter data 126 is generated. The presenter data 126 may then be sent by the communication module 116 to the management server 114, the participant devices 104, or both. The presenter data 126 is discussed in more detail below with regard to FIG. 2.

The management server 114 may include a device management module 128. The device management module 128 is configured to accept the presenter data 126 and generate participant setting data 130. The participant setting data 130 is configured to cause the participant 110 device 104 to modify the state of one or more application modules 118 executing on the participant device 104. In some implementations the presenter data 126 and the participant setting data 130 may be substantially the same, such as where the presenter device 104(1) and the participant device 104 are the same make and model and have the same configuration.

In implementations where the presenter device 104(1) and the participant device 104 differ, the device management module 128 may convert the presenter data 126 to the participant setting data 130. This conversion results in the participant setting data 130 which is configured to cause the participant 110 device 104 to modify the state of one or more of the application modules 118, the device state, and so forth of the participant device 104. The generation of the participant setting data 130 based on the presenter data 126 is discussed in more detail below with regard to FIG. 3.

The management server 114 sends the participant setting data 130 to the participant module 124 of one or more participant devices 104. The participant module 124 is configured to use the participant setting data 130 to change one or more of the state of the application modules 118, the device settings, and so forth. For example, the participant module 124 on the device 104(3) may receive participant setting data 130 which sets the device state to prevent task switching such that the user 102(3) is unable to switch between different application modules 118 executing on the device 104(3). Using this participant setting data 130, the participant module 124 may change the state of the device 104(3) such that user task switching is disabled.

The participant module 124 may be configured to enable acceptance of user input from user input devices, such as touch sensor, buttons, and so forth. This acceptance may be constrained by the participant setting data 130. For example, the participant setting data 130 may allow the participant 110 user 102 to navigate within a chapter or subsection of the eBook presented, but prevent the user 102 from opening up another book.

The participant module 124 may be configured to generate participant status data 132. The participant status data 132 comprises information indicative of the current state of one or more application modules 118, the device, and so forth. For example, the participant status data 132 may indicate that the device 104(2) is current presenting at a particular location in the content 120, the user 102(2) is currently logged into that device 104, and that sound output is muted.

The device management module 128 may receive the participant status data 132 and provide information based on that participant status data 132 to the presenter 108 using the presenter device 104 or another device. For example, participant status data 132 may indicate that the user device 104(3) is presenting the end of the eBook currently being discussed by the user 102(1) acting as the presenter 108. The user 102(1) may see on the user interface 106(1) of the device 104(1) the locations in the eBook of the participants 110, such as the device 104(3) being at the end of the eBook content 120.

In some implementations, the presenter devices 104 and the participant devices 104 may operate in a peer-to-peer mode, wherein the functions of the device management module 128 are provided by one or more of the devices 104. For example, where the devices 104 of the presenters 108 and the participants 110 are of the same make, model, and configuration, no translation from the presenter data 126 to the participant setting data 130 may be called for. In such an implementation, the presenter data 126 may be provided to the participant modules 124.

The device 104 may include both the presenter module 122 and the participant module 124. Furthermore, the roles of presenter 108 and participant 110 may vary during operation such that the device 104 acts as presenter 108, participant 110, or both at the same time.

Other data may also be passed between the devices 104. Audio, video, text messages, and so forth may be exchanged between the devices 104 to facilitate communication between the users 102. For example, the participant 110 devices 104 may send messages to the presenter 108 device 104, and vice versa.

FIG. 2 is a block diagram 200 of the presenter data 126 which may be generated by the presenter device 104 to direct interaction with the content 120. The presenter data 126 may include one or more of application configuration 202, device configuration 204, or other data.

The application configuration 202 may be actual states of the application modules 118 executing on the presenter 108 device 104, or may be desired states which are to be implemented on the participant 110 device 104 but which otherwise do not affect operation of the presenter 108 device 104. Likewise, the device configuration 204 may be actual states of the presenter 108 device 104, or may be desired states which are to be implemented on the participant 110 device 104.

The application configuration 202 provides information indicative of one or more states of the one or more application modules 118. In this illustration, the application configuration 202 includes an application identifier 206, a state parameter 208, and a state setting 210. The application identifier 206 specifies an application module 118 for which the state parameter 208 and the state setting 210 are provided. The state parameter 208 defines a particular state which will be affected, and the state setting 210 for that particular state parameter 208. For example, the application identified 206 as "Reader v.2" has the state parameter 208 "Content.Location" set with a state setting 210 indicating a position within the content 120 of "10493".

The device configuration 204 provides information specifying one or more states of the presenter 108 device 104. In this illustration, the device configuration 204 includes a device parameter 212 and an associated device setting 214. The device parameter 212 defines a particular state which will be affected, and the device setting 214 for that particular device parameter 212. For example, the operating system may have a "User.Task.Switching" device parameter 212 which specifies whether the user 102 may switch between application modules 118. The device setting 214 for this may be set to "Disabled" which presents the user 102 from changing from one application module 118 to another. In another example shown here, the device parameter 212 of "Application.Install" has a device setting 214 of "Hydraulic Simulator". When processed by the participant module 124 of the participant 110 device 104, the application "Hydraulic Simulator" may be installed.

In some implementations the state setting 210, the device setting 214, and so forth may be expressed as a boundary, range of values, start point and end point, and so forth. For example, the state setting 210 for the "Content.Location" state parameter 208 may be "10293-10693". This allows the participant 110 users 102 some flexibility to go back and forth within the content 120. Other state parameters 208 may have different boundaries or flexibility in their constraints.

In some implementations, the presenter data 126 may be provided as key-value pairs. For example, a key may have a value which is associated with a particular application state setting 210, device setting 214, set of other key values, and so forth.

Figure 3:
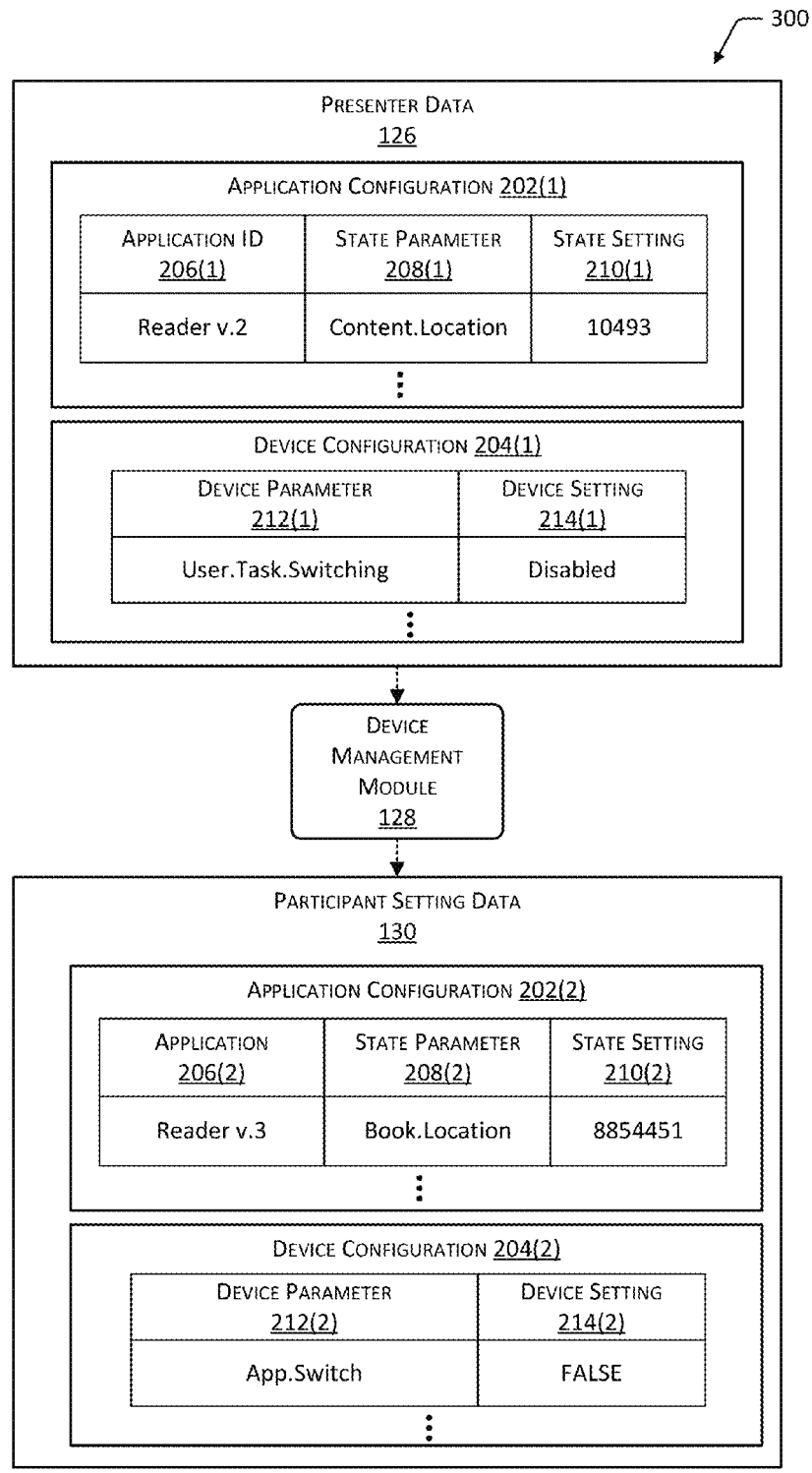
FIG. 3 illustrates a device management module generating participant setting data based on presenter data.

FIG. 3 illustrates a block diagram 300 of the device management module 128 generating participant setting data 130 based on presenter data 126. As described above, the participant setting data 130 indicates the actual state of the presenter 108 device 104, or the state which the presenter 108 seeks to provide to the one or more participant 110 devices 104.

The presenter device 104 and the participant device 104 may differ from one another. In some implementations the presenter 108 device 104 may comprise different hardware, different operating systems, different application modules 118, and so forth from the participant 110 devices 104. Furthermore, the participant 110 devices 104 may differ from one another. For example, the presenter 108 may use a laptop device 104(1), while the participant 110 device 104(2) may comprise a smartphone and the participant 110 device 104(3) may comprise a tablet computer.

The device management module 128 is configured to convert or translate the presenter data 126 into participant setting data 130 which is configured to cause the participant 110 device 104 to modify the state of the participant 110 devices 104. This conversion uses predetermined mappings between different applications, state parameters 208, device parameters 212, and so forth.

For example, as depicted here, the presenter data 126 includes application configuration 202(1) and device configuration 204(1). The application configuration 202(1) indicates that the "Reader v.2" application ID 206(1) has the state parameter 208(1) of "Content.Location" with a state setting 210(1) of "10493". The device configuration 204(1) has the device parameter 212(1) of "User.Task.Switching" with a device setting 214(1) of "Disabled".

In the situation where the participant 110 device 104 differs from the presenter 108 device 104, the presenter data 126 may convey no particular meaning to the presenter 108 device 104. As a result, the device management module 128 generates the participant setting data 130 which is configured to implement corresponding features on the participant 110 device 104.

Continuing the example shown here, the participant setting data 130 includes application configuration 202(2) and device configuration 204(2). The application configuration 202(2) indicates that the "Reader v.3" application ID 206(2) has the state parameter 208(2) of "Book.Location" with a state setting 210(2) of "8854451". The device configuration 204(2) has the device parameter 212(2) of "App.Switch" with a device setting 214(2) of "False". The participant setting data 130, now configured for the particular participant 110 device 104, may be processed by the participant module 124 to change the state of the participant 110 device 104.

Mappings between the presenter data 126 and the participant setting data 130 may be manually entered, determined automatically, or both. For example, in one implementation a system administrator may specify the correspondence between "Content. Location" with "Book. Location".

Figure 4:
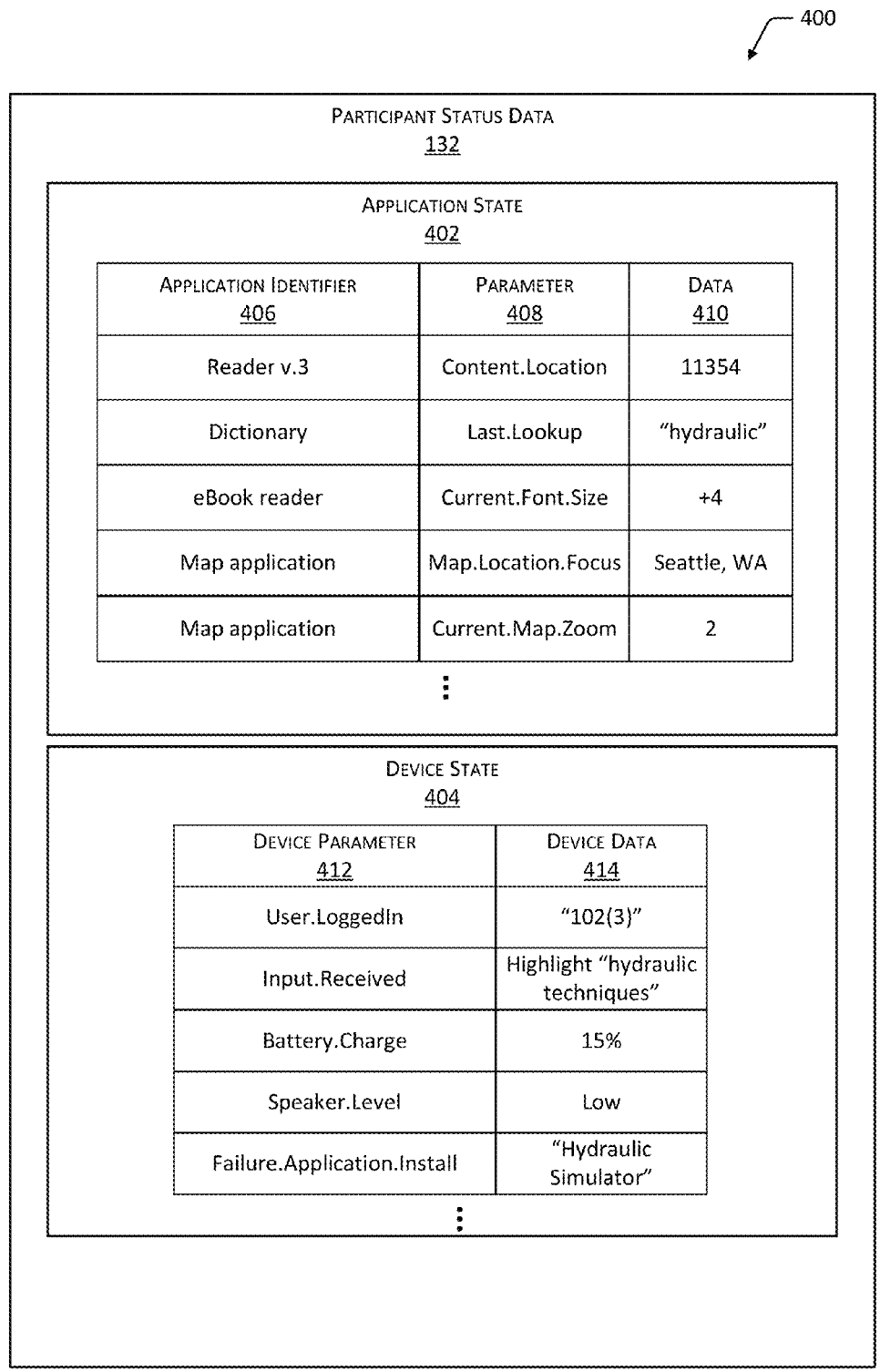
FIG. 4 is block diagram of the participant status data which may be received from participant devices.

FIG. 4 is block diagram 400 of the participant status data 132 which may be received from participant 110 devices 104. As described above, the participant module 124 may be configured to acquire the participant status data 132. The participant status data 132 may comprise application state 402, device state 404, or other information. The participant status data 132 thus provides a "snapshot" of the participant 110 device 104 at the time the data was recorded.

The application state 402 is indicative of the actual state of the application modules 118 executing on the participant 110 device 104. Likewise, the device configuration 204 is actual state of the participant 110 device 104.

The application state 402 provides information indicative of one or more states of the one or more application modules 118. The application modules 118 may be executing, suspended, closed, and so forth. In this illustration, the application state 402 includes an application identifier 406, a parameter 408, and data 410. The application identifier 406 specifies an application module 118 for which the parameter 408 and the data 410 are provided. The parameter 408 designated a particular state, and the data 410 the value of the particular state. For example, the application identified 406 as "Reader v.3" has the parameter 408 "Content.Location" with data 410 of "11354". In this example, this may indicate that the participant 110 device 104 is currently presenting the eBook content 120 at location "11354".

The device state 404 provides information indicative of one or more states of the participant 110 device 104. In this illustration, the device state 404 includes a device parameter 412 and associated device data 414. The device parameter 412 defines a particular device state 404, and the device data 414 the current value. For example, the operating system may provide "User.LoggedIn" device parameter 412 which specifies what user account is currently logged in, indicating the current user 102. The device data 414 may be "102(3)" which indicates user 102(3) is logged into that participant 110 device 104. In another example illustrated, the device parameter 412 "Failure.Application.Install" has device data 414 of "Hydraulic Simulator", indicating that the installation of this application module 118 has failed on the participant 110 device 104(3).

The participant status data 132 may be sent when data changes, at predetermined intervals, in response to polling, and so forth. The participant status data 132 may be sent to the device management module 128 executing on the management server 114 or the presenter 110 device 104.

The device management module 128 may receive the participant status data 132 and provide information based on the participant status data 132 to the presenter module 122. For example, the participant module 122 may receive information that the installation of the "Hydraulic Simulator" application module 118 failed on the participant 110 device 104(3), but has succeeded on the other participant 110 devices 104. An example user interface 106 and the various status information which may be presented is discussed below with regard to FIG. 6.

In some implementations, the participant status data 132 may be provided as key-value pairs, extensible markup language ("XML"), JavaScript Object Notation ("JSON"), and so forth. For example, a key value may be associated with a particular application state 402, device state 404, and so forth.

Figure 5:
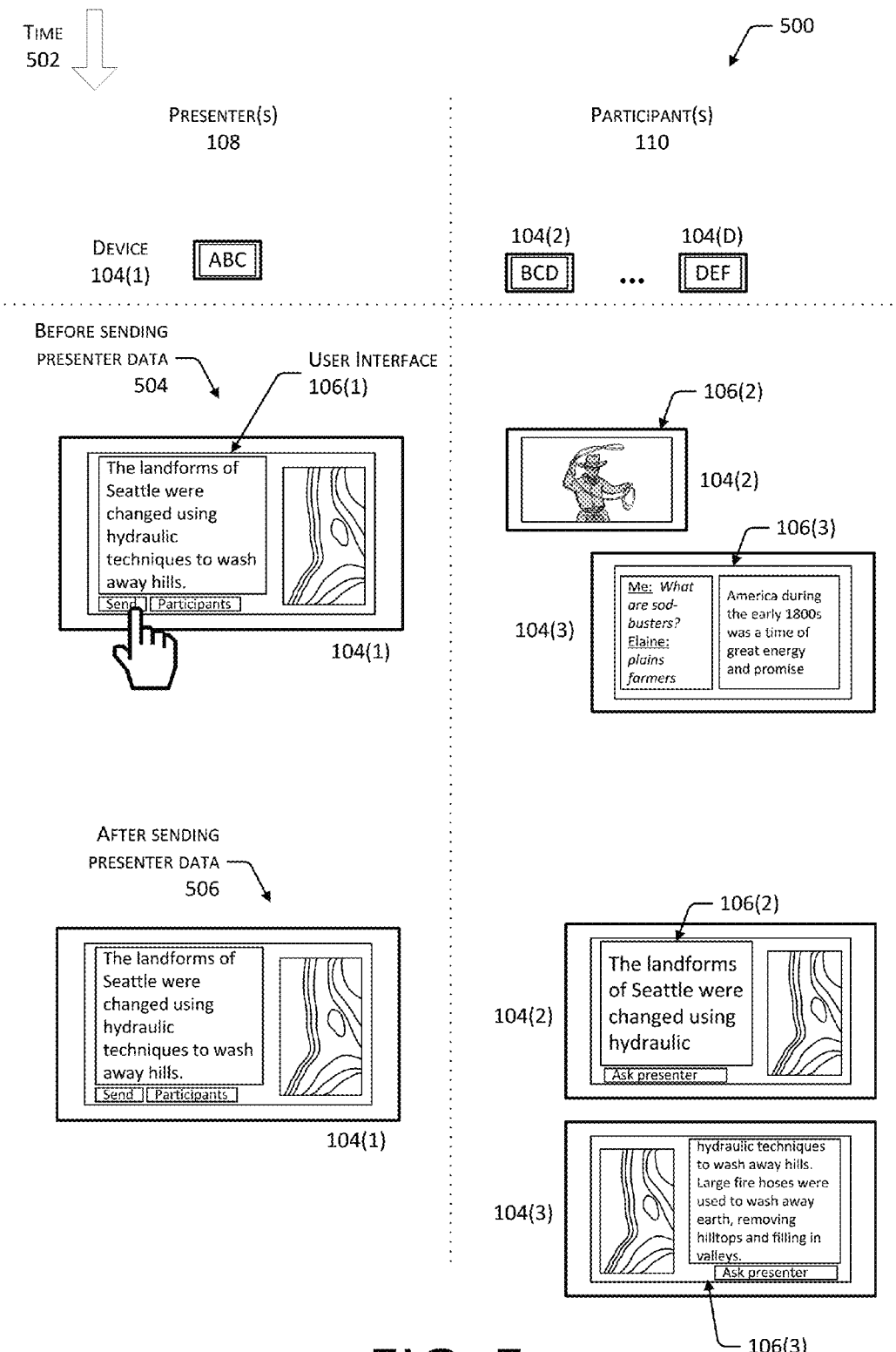
FIG. 5 illustrates a scenario of a presenter directing interaction on participant devices using presenter data.

FIG. 5 illustrates a scenario 500 of the presenter 108 device 104 directing interaction on several participant 110 devices 104. In this illustration time 502 is indicated by an arrow as increasing down the page. In this illustration presenter 108 device 104(1) and participant 110 devices 104(2)-(D) are depicted.

Before sending presenter data 504, the user interface 106(1) of the presenter 108 device 104 displays some text from an eBook using a reader application module 118 and a map application module 118. The eBook is at a particular location within the content 120, and the map is centered on a particular geographic location with a particular zoom level. The participant 110 devices 104(2)-(3) have not yet received the participant setting data 130, based on the presenter data 126 from the presenter 108 device 104. As a result, the device 104(2) is presenting video content 120, and the device 104(3) is executing a messaging application module 118 and a reader application module 118 with an eBook open.

The presenter 108 user 102(1) may activate one or more controls on the device 104(1) using the user interface 106(1), or may have configured the presenter 108 device 104(1) to send presenter data 126 to the device management module 128. For example, as shown here the user 102(1) has selected the "send" control which is configured to, when activated, send the presenter data 126. The presenter data 126 is indicative of the particular location within the eBook and the map application settings. The device management module 128, as described above, generates participant setting data 130 which is sent to the participant 110 devices 104.

After sending the presenter data 506, the state of the participant 110 devices 104(2)-(3) has been changed as illustrated here. The participant modules 124 of the participant 110 devices 104(2)-(3) have processed the participant setting data 130 and made changes to the state of the application modules 118, device, and so forth. As a result, the participant 110 devices 104(2)-(3) are now displaying the particular eBook content 120 and the map application as designated by the presenter 108 device 104.

However, the presentation of the content 120 such as the eBook and the map by the participant 110 devices 104 need not be identical. As illustrated here, the participant 110 device 104(2) is configured to present text at a larger size, perhaps to aid a participant 110 with vision difficulties. As also illustrated, the participant 110 device 104(3) presents the eBook content 120 at a slightly different location, such as where the user 102(3) is a fast reader who has moved ahead slightly. Furthermore, the relative position of the map application module 118 and the reader application module 118 on the participant 110 device 104(3) may be arranged differently from the presenter 108 device 104. For example, the user 102(3) using the device 104(3) may be left-handed and prefer a different arrangement.

As illustrated here, one or more presenter 108 devices 104 may direct the interaction of users 102 using participant 110 devices 104. The directed interaction provides constraints determined by the presenter 108 devices 104 and which are implemented on the participant 110 devices 104.

Figure 6:
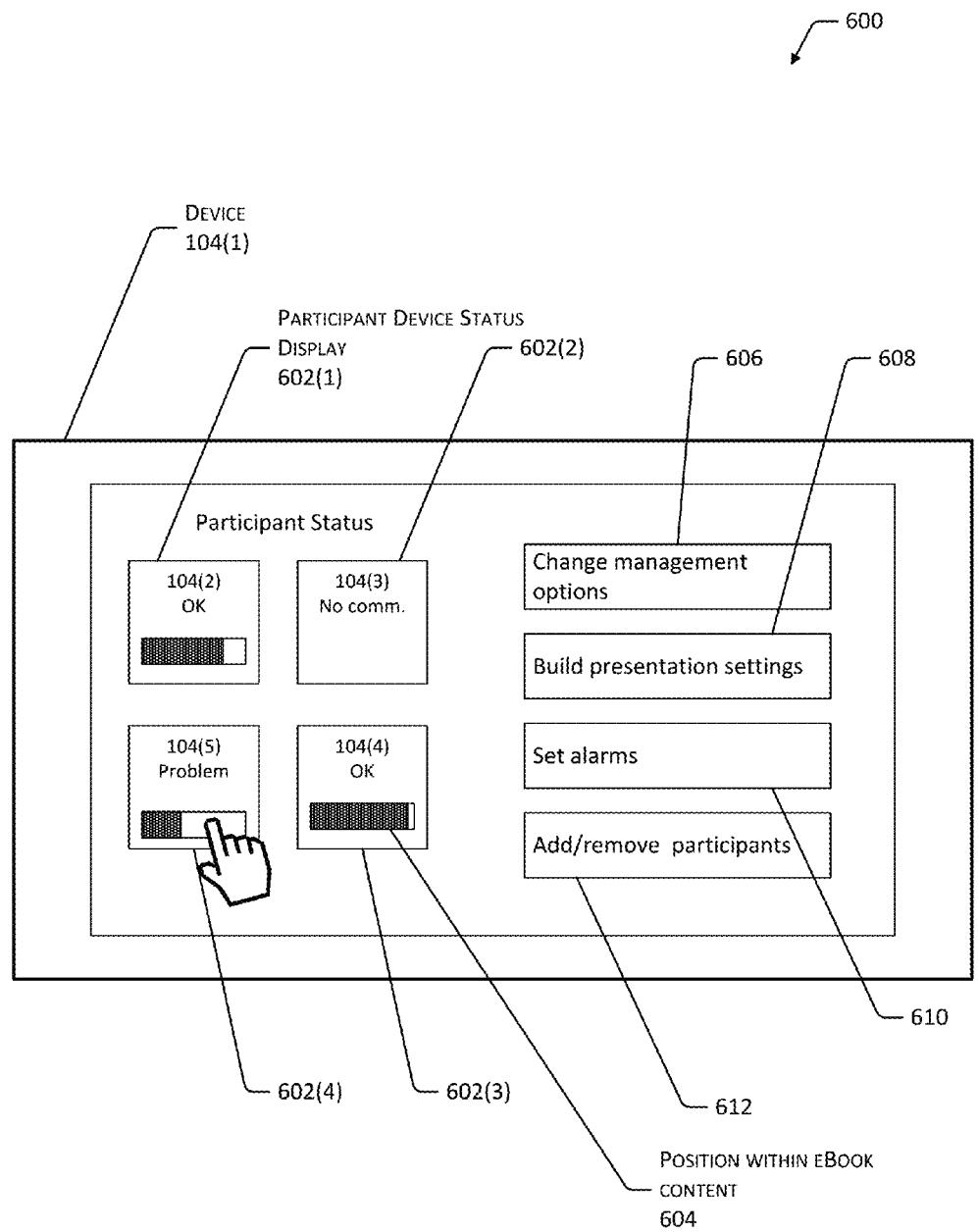
FIG. 6 illustrates a user interface configured to allow a presenter to manage participant devices.

FIG. 6 illustrates a user interface 600 configured to allow the presenter 108 device 104 to manage participant 110 devices 104. In this illustration, four graphical tiles depict participant device status displays 602(1)-(4). The participant device status displays 602 may be configured to present information indicative of whether the participant 110 devices 104 are ready to present. For example, the presenter 108 user 102(1) is thus able to see in this illustration that devices 104(2) and 104(4) are operating normally. However, device 104(3) is out of communication while device 104(5) is having some sort of problem. The user 102(1) may select one of the tiles to view additional information. This additional information is described below with regard to FIG. 7.

The participant device status display 602 may also include an indicator 604 showing position with eBook content or other content 120. For example, the indicator 604 may be depicted as a bar chart. In this illustration, the indicators 604 show that the device 104(5) is presenting the content 120 at about the first third of the content 120, while the device 104(4) is presenting the content 120 at almost the end of the content 120.

Other controls may be presented within the user interface 600. A change management options control 606 activates a user interface 106 configured to present various options such as how frequently to send presenter data 126, which management server 114 to use, and so forth.

A build presentation setting control 608 activates a user interface 106 configured to provide the user 102 with presentation settings indicative of what and how to provide the directed interaction. The presentation settings may include what information to include or omit in the presenter data 126. For example, the reader application module 118 may be configured to be interrogated for generation of presenter data 126 while the browser application module 118 is not.

A set alarms control 610 may be configured to set alerts or notifications to the presenter 108 user 102(1) based on the participant status data 132. For example, the presenter 108 user 102(1) may use the build presentation setting control 608 on the device 104(1) to specify that content locations 11200-29911 in eBook content 120 are recommended for the reading on Monday. However, this may be a "soft" constraint in that this is presented on the participant 110 devices 104(2)-(D) as a recommendation message, rather than limiting access only to the content locations 11200-29911, or may default to the last location accessed within the content locations 11200-29911. The set alarms control 610 may be used to send a notification to the presenter 108 device 104 when one of the participant 110 devices 104(2)-(D) views content 120 past the content location 29911. Other alarms may be set to notify of failures or problems in the participant 110 devices 104(2)-(D), such as presenting the "problem" indicator in the participant device status display 602(4).

An add/remove participants control 612 is also depicted. The control 612 may be used to add or remove user accounts associated with the users 102, devices 104, or both to the participants 110. For example, the user account associated with the user 102(3) may be added to the participants 110 such that, when that user account is logged into a device 104, the device 104 is joined to the group of participants 110 and will receive participant setting data 130 from the device management module 128.

Additional controls, displays, and other user interface elements may be provided in other implementations. For example, displays indicating battery charge of the participant 110 devices 104(2)-(D), depicting physical location of the devices 104(2)-(D), and so forth may be presented.

Figure 7:
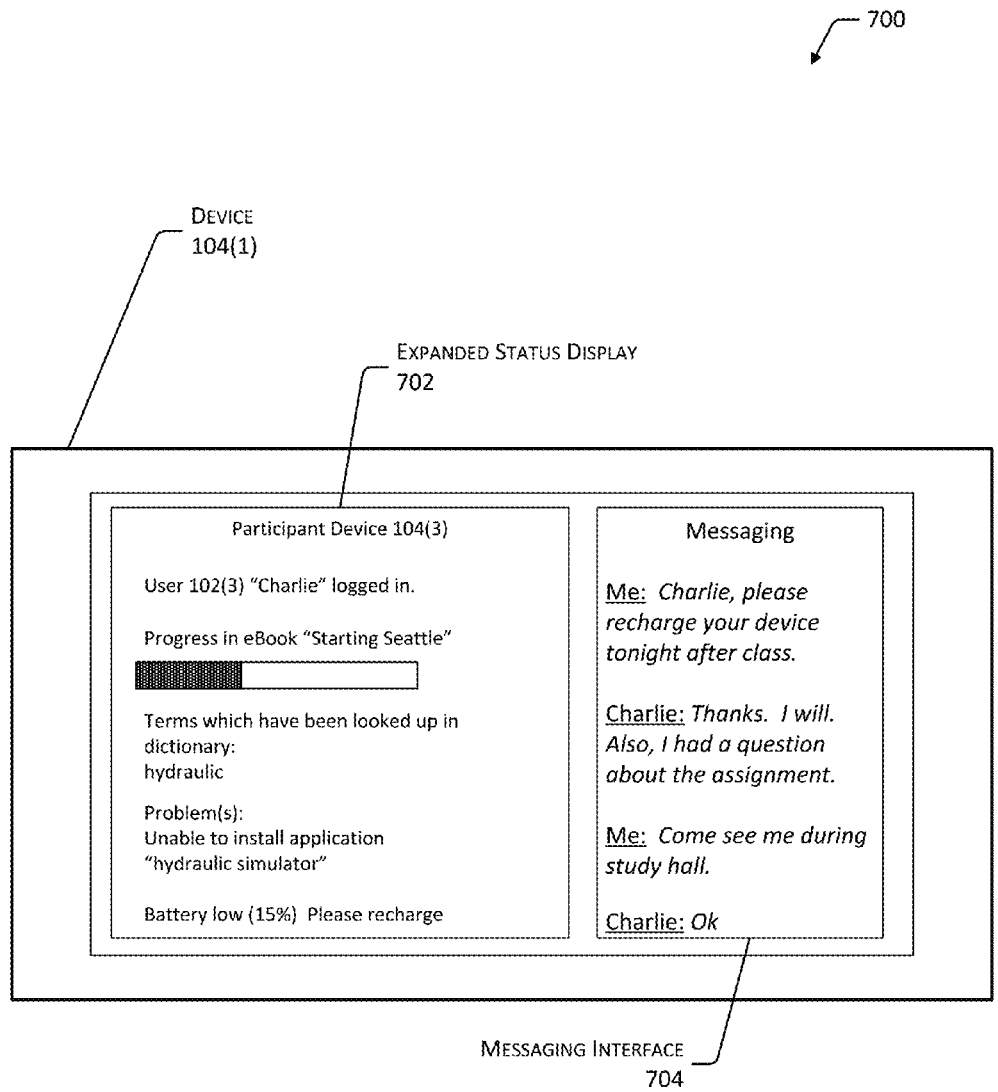
FIG. 7 illustrates a user interface configured to provide messaging with, and detail information about, a particular participant device.

FIG. 7 illustrates a user interface 700 configured to provide messaging with, and detail information about, a particular participant 110 device 104. In one implementation, this user interface 700 may be accessed by selecting one of the participant device status displays 602 described above with regard to FIG. 6.

In this illustration, an expanded status display 702 provides detailed information about a particular device 104. The name "Charlie" of the user 102(3) who is logged into the device 104(3) is shown, as well as a graphical representation of Charlie's progress in the eBook content titled "Starting Seattle". Additional information is presented, such as Charlie has looked up the word "hydraulic" using the dictionary application. The device 104(3) is also experiencing a problem in that the application "Hydraulic Simulator" is not installed properly. Additionally, battery charge of the device 104(3) is shown, indicating the battery is low and a recharge is recommended.

The information provided in the expanded status display 702 is based at least in part on the participant status data 132. Other information may also be incorporated into the display. For example, the other information may include Charlie's grades to date in the class, answers so far on a test currently being delivered using the device 104(3), and so forth. The information provided in the expanded status display 702 may be configured by the presenter 108 user 102(1), or by another party such as a system administrator.

The directed interaction may include communication amongst the one or more presenters 108, the one or more participants 110, or between the presenters 108 and the participants 110. For example, the presenter 108 user 102(1) may use the device 104(1) to exchange text, audio, or video messages with the participant 110 user 102(2). This communication may be mediated or facilitated using the device management module 128, another module, or by an external service or server.

In this illustration, a messaging interface 704 is provided to facilitate this interpersonal communication. As shown here, the user 102(1) is reminding the user 102(3) Charlie to recharge his device, and responds to a question Charlie had about the assignment.

The presenter data 126 may be configured to enable, disable, or constrain messaging functions. For example, communication between the presenter 108 user 102(1) and each of the individual participant 110 users 102(2)-(U) may be permitted, while communications between the participant 110 users 102(2)-(U) is denied.

Figure 8:
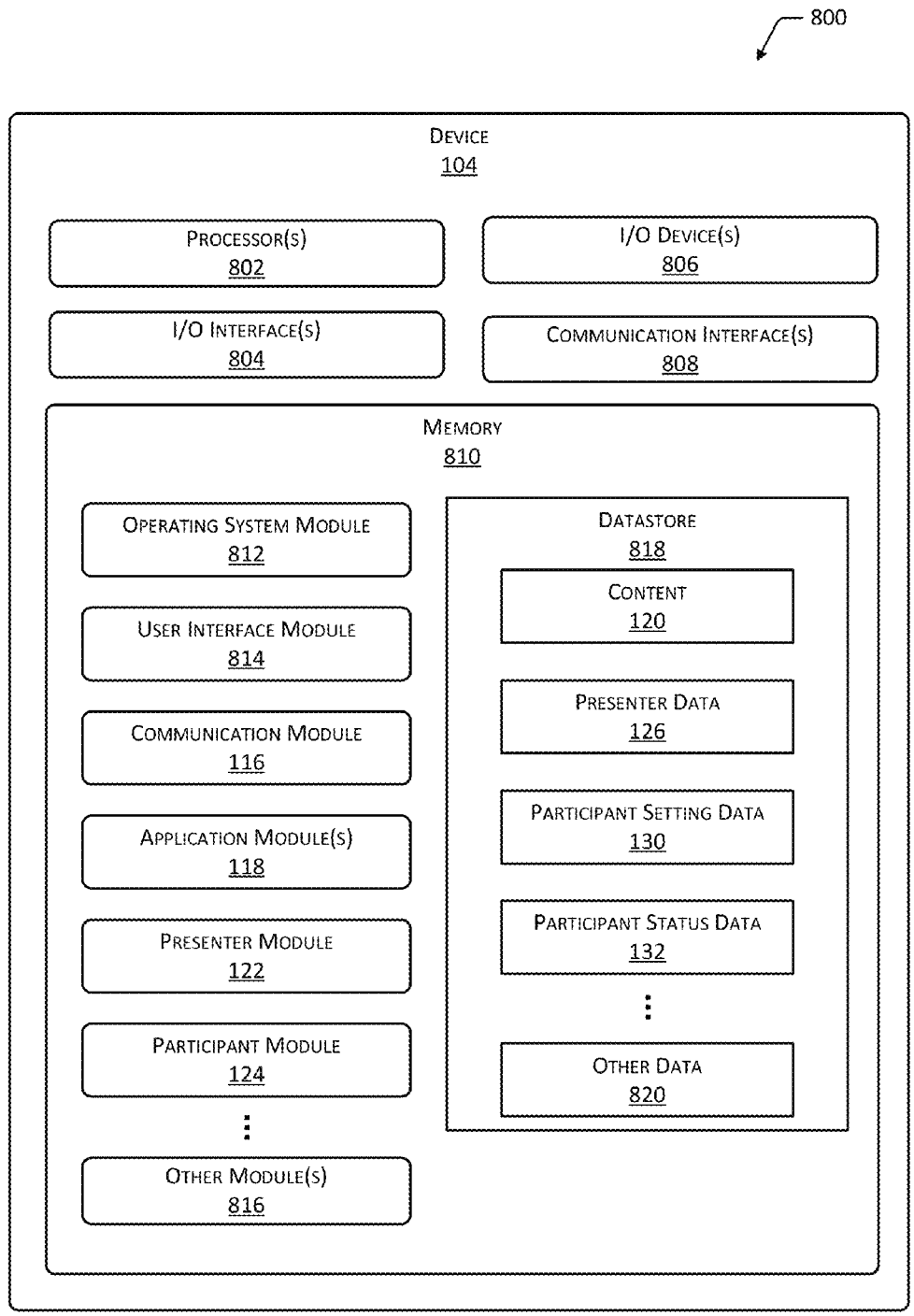
FIG. 8 illustrates a block diagram of a device which may be configured to act as a presenter, a participant, or both in a directed interaction.

FIG. 8 illustrates a block diagram 800 of the device 104 which may be configured to act as the presenter 108, the participant 110, or both, in a directed interaction. The device 104 may include one or more processors 802 configured to execute one or more stored instructions. The processors 802 may comprise one or more cores. The device 104 may include one or more input/output ("I/O") interface(s) 804 to allow the processor 802 or other portions of the device 104 to communicate with other devices. The I/O interfaces 804 may comprise inter-integrated circuit ("I2C"), serial peripheral interface bus ("SPI"), Universal Serial Bus ("USB") as promulgated by the USB Implementers Forum, RS-232, one or more device interfaces such as High Definition Multimedia Interface ("HDMI") as promulgated by HDMI Licensing LLC, TOSLINK as promulgated by Toshiba Corp., IEEE 1394 as promulgated by the IEEE, and so forth.

The I/O interface(s) 804 may couple to one or more I/O devices 806. The I/O devices 806 may include input devices such as one or more of a camera, a microphone, a touch sensor, a button, and so forth. The I/O devices 806 may also include output devices such as one or more of a display, audio speakers, haptic output devices, and so forth. The display may comprise an electrophoretic display, projector, liquid crystal display, interferometric display, light emitting diode display, and so forth. In some embodiments, the I/O devices 806 may be physically incorporated with the device 104 or may be externally placed.

The device 104 may also include one or more communication interfaces 808. The communication interfaces 808 are configured to provide communications between the device 104, other devices 104, the management server 114, routers, access points, servers, and so forth. The communication interfaces 808 may include devices configured to couple to one or more networks including PANs, LANs, WLANs, WANs, and so forth.

The device 104 may also include one or more busses or other internal communications hardware or software that allow for the transfer of data between the various modules and components of the device 104.

As shown in FIG. 8, the device 104 includes one or more memories 810. The memory 810 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 810 provides storage of computer readable instructions, data structures, program modules and other data for the operation of the device 104.

The memory 810 may include at least one operating system ("OS") module 812. The OS module 812 is configured to manage hardware resource devices such as the I/O interfaces 804, the I/O devices 806, the communication interfaces 808, and provide various services to applications or modules executing on the processors 802. Also stored in the memory 810 may be one or more of the following modules. These modules may be executed as foreground applications, background tasks, daemons, and so forth.

A user interface module 814 is configured to provide the user interface 106 to the user 102 using the I/O devices 806 and to accept inputs received from the I/O devices 806. The user interface 106 may include one or more visual, audible, or haptic elements. For example, the user interface 106 may be configured to provide a graphic user interface, an audible user interface, and so forth.

The communication module 116, as described above, is configured to support communication between the devices 104, the management server 114, and so forth using the network 112. The application modules 118 may include one or more of eBook readers, browsers, calculators, word processors, spreadsheets, slideshow presenters, drawing programs, and so forth.

The presenter module 122 may be configured to acquire information about the state of the device 104, the application modules 118 executing on the device 104, or both. The information may be acquired by accessing the state stored in the memory 810, such as variable values, registers, and so forth. In some implementation, where the application modules 118 execute at least in part on another device, a request for the state information may be made to the other device. Responses to the request may be returned to the device 104, or to the device management module 128. The OS module 812 may be configured to work in conjunction with the presenter module 122, such that OS functions may be accessible to presenter module 122. For example, state or other data from the OS may be provided to the presenter module 122 for use in generating the presenter data 126.

Based on the information acquired, the presenter data 126 is generated. The presenter data 126 may then be sent by the communication module 116 to the management server 114, the participant devices 104, or both.

The participant module 124 is configured to use the participant setting data 130 to change one or more of the state of the application modules 118, the device settings 214, and so forth. For example, the participant module 124 on the device 104(3) may receive participant setting data 130 which sets the application state 402 of the map application module 118 to open a map at particular coordinates and in a particular zoom level. Using this participant setting data 130, the participant module 124 may change the state of the application 402 executing at least in part on the device 104(3) such that the map is presented at the particular location and zoom level. The OS module 812 may be configured to work in conjunction with the participant module 124, such that OS functions may be accessible to participant module 124. For example, the participant module 124 may be configured to affect one or more changes in the OS module 812 of the device 104.

As also described above, the participant module 124 may be configured to generate participant status data 132. The generation may include acquiring information about the state of the device 104, the one or more application modules 118 executing on the device 104, or both. The information may be acquired by accessing the state stored in the memory 810, such as variable values, registers, and so forth. In some implementation, where the application modules 118 execute at least in part on another device, a request for the state information may be made to the other device.

The participant status data 132 comprises information indicative of the current state of one or more application modules 118, the device 104, and so forth. For example, the participant status data 132 may indicate that the device 104(2) is currently presenting a particular location in the content 120, the user 102(2) is currently logged into that device 104(2), and that sound output is muted.

Other modules 816 may also be present. For example, a digital rights management module may provide support for presenting or processing content 120 protected using one or more digital rights management schemes.

The memory 810 may also include a datastore 818 to store information. The datastore 818 may use a flat file, database, linked list, tree, executable code, or other data structure to store the information. In some implementations, the datastore 818 or a portion of the datastore 818 may be distributed across one or more other devices including servers, network attached storage devices and so forth.

As depicted here, the datastore 818 may store one or more of the content 120, the presenter data 126, the participant setting data 130, or participant status data 132. Other data 820 may also be stored. For example, the other data 820 may include user preferences, configuration files, and so forth.

Figure 9:
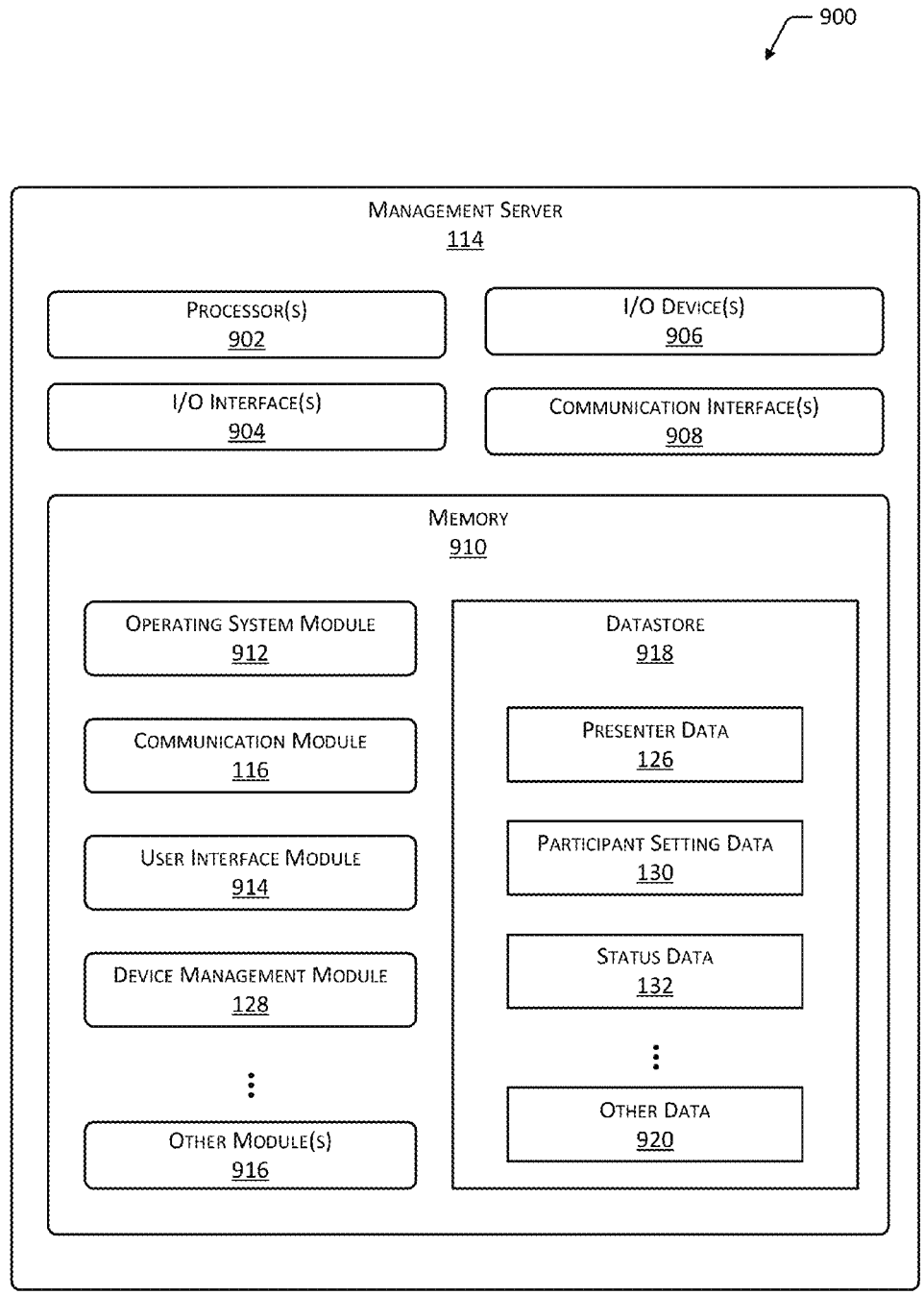
FIG. 9 illustrates a block diagram of a management device which may be configured to coordinate the directed interaction between one or more presenter devices and one or more of the participant devices.

FIG. 9 illustrates a block diagram 900 of the management device 114 which may be configured to coordinate the directed interaction between one or more presenter 108 devices 104 and one or more of the participant 110 devices 104.

The management server 114 may include one or more processors 902 configured to execute one or more stored instructions. The processors 902 may comprise one or more cores. The management server 114 may include one or more I/O interface(s) 904 to allow the processor 902 or other portions of the management server 114 to communicate with other devices. The I/O interfaces 904 may comprise I2C, SPI, USB, RS-232, and so forth.

The I/O interface(s) 904 may couple to one or more I/O devices 906. The I/O devices 906 may include input devices such as one or more of a keyboard, mouse, and so forth. The I/O devices 906 may also include output devices such as one or more of a display, audio speakers, haptic output devices, and so forth. In some embodiments, the I/O devices 906 may be physically incorporated with the management server 114 or may be externally placed.

The management server 114 may also include one or more communication interfaces 908. The communication interfaces 908 are configured to provide communications between the management server 114, the devices 104, routers, access points, servers, and so forth. The communication interfaces 908 may include devices configured to couple to one or more networks including PANs, LANs, WLANs, WANs, and so forth.

The management server 114 may also include one or more busses or other internal communications hardware or software that allow for the transfer of data between the various modules and components of the management server 114.

As shown in FIG. 9, the management server 114 includes one or more memories 910. The memory 910 comprises one or more CRSM. The memory 910 provides storage of computer readable instructions, data structures, program modules and other data for the operation of the management server 114.

The memory 910 may include at least one OS module 912. The OS module 912 is configured to manage hardware resource devices such as the I/O interfaces 904, the I/O devices 906, the communication interfaces 908, and provide various services to applications or modules executing on the processors 902. Also stored in the memory 910 may be one or more of the following modules. These modules may be executed as foreground applications, background tasks, daemons, and so forth.

A user interface module 914 may be configured to provide one or more application programming interfaces. The user interface module 914 may also provide data configured to provide the user interfaces 106 on the devices 104, such as hypertext markup language ("HTML") files. The user interface module 914 is configured to accept inputs and send outputs using the I/O interfaces 904, the communication interfaces 908, or both.

The communication module 116, as described above, is configured to support communication with the devices 104, routers, and so forth using the network 112. In some implementations the communication module 116 may support encrypted communications. For example, hypertext transport protocol secured ("HTTPS") or transport layer security ("TLS") may be supported.

The device management module 128 is configured to accept the presenter data 126 and generate participant setting data 130. The participant setting data 130 is configured to cause the participant 110 device 104 to modify the state of one or more application modules 118 executing on the participant device 104. In some implementations the presenter data 126 and the participant setting data 130 may be substantially the same, such as where the presenter device 104 and the participant device 104 are the same make and model and have the same configuration. In these implementations, the device management module 128 may pass the presenter data 126 along as the participant setting data 130 without substantial modification. Alternatively, the presenter 108 device 104 may send the presenter data 126 to the participant 110 device 104.

As described above with regard to FIG. 3, the device management module 128 may be configured to convert or translate the presenter data 126 into participant setting data 130 which is configured to cause the participant 110 device 104 to modify operation of the particular participant 110 device 104.

Other modules 916 may also be present. In one implementation, a language translation module may be configured to provide translation of content 120, messages, or both, enabling directed interaction of a group of users 102 which use different languages. For example, the text messages may be translated between German and English and vice versa.

The memory 910 may also include a datastore 918 to store information. The datastore 918 may use a flat file, database, linked list, tree, executable code, or other data structure to store the information. In some implementations, the datastore 918 or a portion of the datastore 918 may be distributed across one or more other devices including servers, network attached storage devices and so forth.

As depicted here, the datastore 918 may store one or more of the presenter data 126, the participant setting data 130, or participant status data 132. In some implementations content 120 may be stored. Other data 920 may also be stored. For example, the other data 920 may include user preferences, configuration files, user account information, and so forth.

Illustrative Processes

Figure 10:
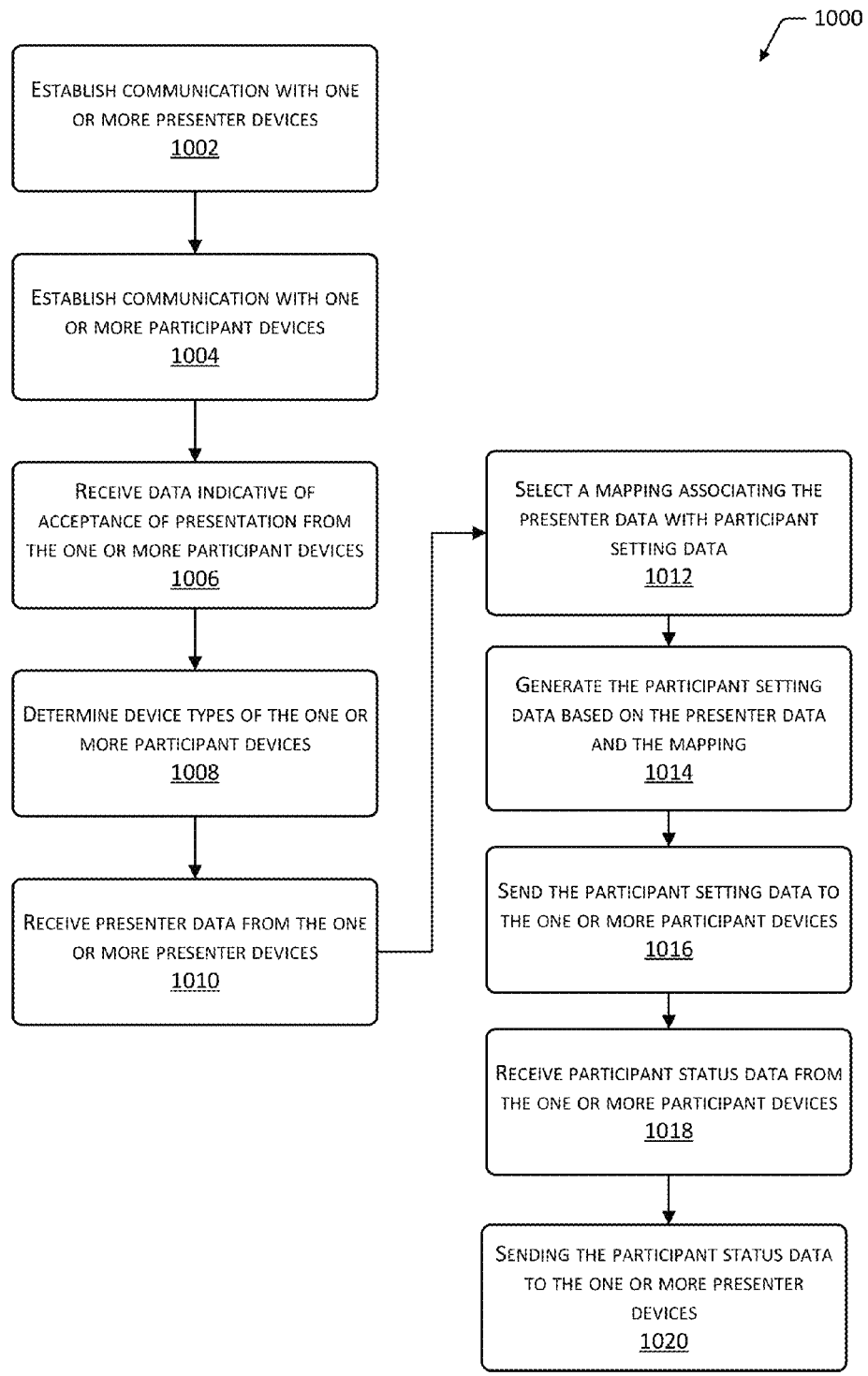
FIG. 10 is a flow diagram of a process of a server facilitating directed interaction by receiving presenter data and generating participant setting data.

FIG. 10 is a flow diagram 1000 of a process of the management server 114 facilitating directed interaction. This process may be implemented at least in part by the devices 104, the management server 114, or a combination thereof.

Block 1002 establishes communication with one or more presenter 108 devices 104. For example, the communication module 116 of the management server 114 may receive a request from the presenter 108 device 104(1) to initiate a directed interaction. In some implementations the communication may be encrypted.

Block 1004 establishes communication with one or more participant 110 devices 104. Continuing the example, the communication module 116 of the management server 114 may establish a connection with the participant 110 devices 104(2)-(D). In some implementations the communication may be encrypted.

Block 1006 receives data indicative of acceptance of presentation from the one or more participant 110 devices 104. For example, the participant 110 devices 104 may be configured to present a user interface 106 asking the user 102 for approval to engage in a directed interaction. This acceptance may also indicate approval to generate and provide the participant status data 132 to one or more of the device management module 128, or the one or more presenters 108.

Block 1008 determines device types of the one or more participant 110 devices 104. For example, the device management module 128 may request data from the participant 110 devices 104, retrieve information from a datastore 818, and so forth. The device type is indicative of one or more of hardware, operating system, or application installed on the participant 110 device 104. For example, the device type may indicate the particular make, model, and operating system of the participant 110 devices 104.

Block 1010 receives presenter data 126 from one or more presenter 108 devices 104. For example, the communication interface 908 of the management server 114 may receive the presenter data 126 from the device 104(1) as sent over the network 112. In some implementations, the presenter data 126 may have been previous received or stored in another location, and the presenter data 126 is accessed therefrom.

As described above, the presenter data 126 may include information about one or more application states of the presenter 108 device 104, one or more device states of the presenter 108 device 104, or both. The application state settings 210 may include one or more of: a reference to a piece of content 120 such as a content identifier, a location within a piece of content 120 such as a page number or time index, a uniform resource locator, or a uniform resource identifier.

The device data may include one or more of: a user permission state enabling the user 102 to switch between two or more executing applications, audio output settings, power state of one or more components of the presenter 108 device 104, or a user input state enabling acceptance of user input from one or more user input devices 806.

Block 1012 selects a mapping between the presenter data 126 and the participant setting data 130 using the device type, or another characteristic. For example, the mapping may associate a device type of "A" having the state parameter of "Content.Location" with device type "B" having the state parameter of "Book.Location".

Block 1014 generates, based at least in part on the presenter data 126, participant setting data 130. The participant setting data 130 may be based at least in part on one or more characteristics of the participant 110 device 104, such that participant setting data 130 is configured to be processed by the participant 110 device 104. As described above, the participant setting data 130 is configured to, when processed by the participant 110 device 104, cause the participant device 104 to modify operation of the participant 110 device 104. This modification may include one or more application states of the participant 110 device 104, one or more device states of the participant 110 device 104, or both. In some implementations, the generating the participant setting data 130 is further based on the mapping between the presenter data 126 and the participant setting data 130.

The application state settings 210 may include one or more of: application focus, application to execute, portion of content 120 to present, user interface configuration, and so forth. The device settings may include one or more of: enabling or disabling specific hardware of the device 104, setting a display mode on a display device 806, setting an audio output level of an audio output device 806, enabling or disabling task switching in an operating system, and so forth.

In some implementations an association may be determined between the presenter data 126 and the one or more participant 110 devices 104. For example, a list may be maintained which designates the participant 110 devices 104(2)-(5) are associated with the presenter data 126.

Block 1016 sends the participant setting data 130 to one or more participant 110 devices 104. For example, the communication interface 908 of the management server 114 may send the participant setting data 130 from the management server 114 to the participant 110 devices 104(2)-(D) over the network 112.

In some implementations, the sending may be based on the previously specified association between the presenter data 126 and the one or more participant 110 devices 104. For example, the participant 110 devices 104(2)-(5) may receive the presenter data 126, while other devices such as 104(6), which is not associated, will not receive the presenter data 126.

Block 1018 receives participant status data 132 from the one or more participant 110 devices 104. For example, the communication interface 908 of the management server 114 may receive the participant status data 132 from the devices 104(2)-(D) as sent over the network 112. As described above, the participant status data 132 may comprise data indicative of one or more of an application state or a device state of the participant 110 device 104.

Block 1020 sends the participant status data 132, or information based on at least a portion of the participant status data 132, to the one or more presenter 108 devices 104. For example, the participant status data 132 may be aggregated or otherwise processed, and the resulting data sent to the device 104(1).

Figure 11:
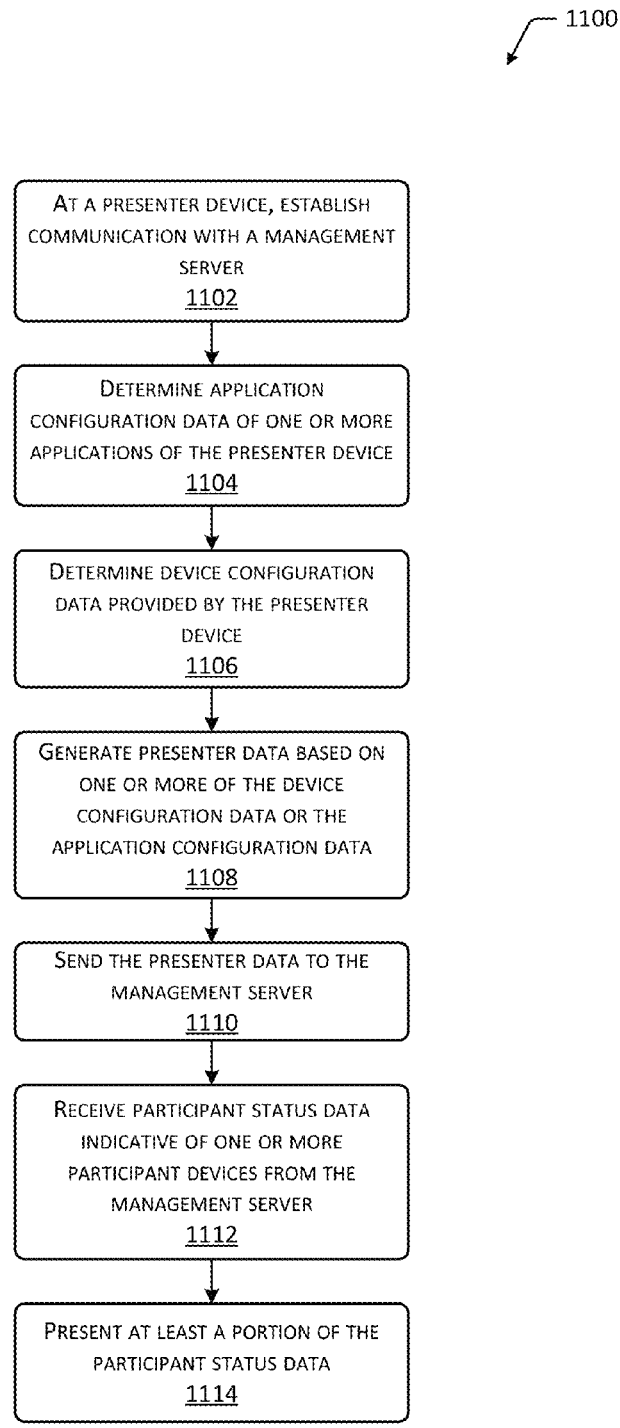
FIG. 11 is a flow diagram of a process of a presenter device directing interaction by generating presenter data.

FIG. 11 is a flow diagram 1100 of a process of the presenter 108 device 104 directing interaction by generating presenter data 126. This process 1100 may be implemented at least in part by the devices 104, the management server 114, or a combination thereof.

Block 1102, at a presenter 108 device 104, establishes communication with the device management module 128 of the management server 114. In other implementations, the device management module 128 may be executing on the presenter 108 device 104 or on another device.

Block 1104 determines application configuration data of one or more application modules 118 of the presenter 108 device 104. For example, the application module 118 "Reader v.2" has the state parameter 208 "Content.Location" set with a state setting 210 indicating a position within the content 120 of "10493".

Block 1106 determines device configuration data provided by the presenter 108 device 104. For example, a "User.Task.Switching" device parameter 212 may be specified with a device setting 214 of "Disabled". The device configuration data may reflect the actual state of the presenter 108 device 104, or may be specified by the presenter 108 device 104 but not affect the state of the presenter 108 device 104. For example, the user 102(1) may set this parameter to disable the participants 110 from switching between application modules 118 on the devices 104(2)-(D), but may retain the ability to do so on his device 104(1).

Block 1108 generates presenter data 126 based on the device configuration data, the application configuration data, or both. For example, the presenter module 122 may create the presenter data 126 as key-value pairs, XML, JSON, and so forth.

Block 1110 sends the presenter data 126 to the device management module 128. As described above, the device management module 128 may execute at least in part on the management server 114.

Block 1112 receives participant status data 132 indicative of the state of one or more participant 110 devices 104. The participant status data 132 may be received from the various participant 110 devices 104, the device management module 128 of the management server 114, or both.

Block 1114 presents at least a portion of the participant status data 132. For example, the data may be presented using user interfaces 600 or 700 to report the condition of the different participant 110 devices 104.

Figure 12:
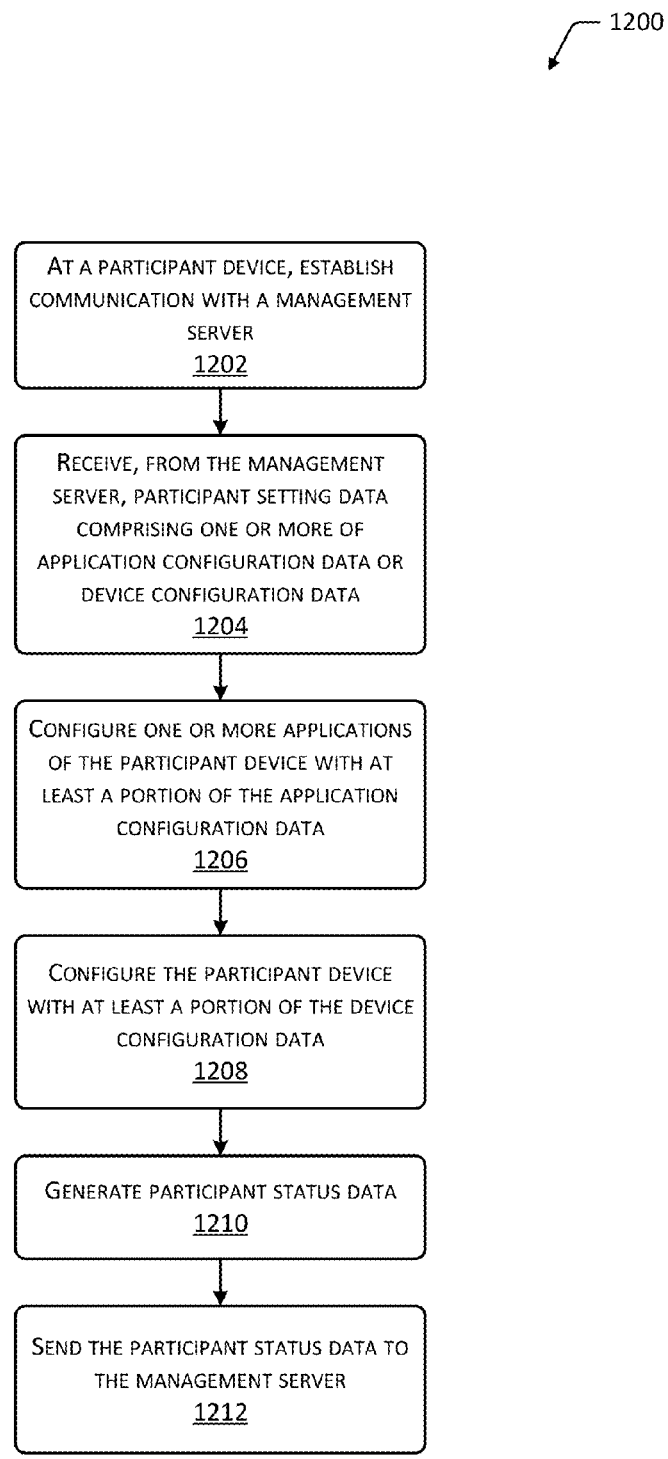
FIG. 12 is a flow diagram of a process of a participant's device modifying operation based on received participant setting data.

FIG. 12 is a flow diagram 1200 of a process of a participant 110 device 104 modifying operation based on received participant setting data 130. This process 1200 may be implemented at least in part by the devices 104, the management server 114, or a combination thereof.

Block 1202 establishes communication with the device management module 128 of the management server 114. As described above, in other implementations, the device management module 128 may execute on the device 104.

Block 1204 receives participant setting data 132. As described above, the participant setting data 132 may include one or more of application configuration data or device configuration data.

Block 1206 configures one or more of applications (e.g., the application modules 118) with at least a portion of the application configuration data, such that the application state 402 changes from a first application state 402 to a second application state 402 provided by the participant setting data 130. For example, the application configuration data may specify a particular location for the map application module 118 to present on the display. In another example, the first state comprises a first uniform resource locator, and the second state comprises a second uniform resource locator.

As described above, the participant setting data 130 may include one or more excursion boundaries, within which the second state is modifiable based on user input. For example, the participant 110 user 102 may be allowed to read between locations 12931 and 19994 in the eBook content 120. In another example, the acceptance of user input may be constrained by the participant setting data 130.

The changes to the application state, or to the device state described below, may be temporary. In some implementations data indicative of the first state may be stored. After a predetermined period of time has elapsed since receiving the participant setting data 130, upon reaching a predetermined clock time, or another event, the application module 118 may be restored to the first state using the stored data indicative of the first state. For example, the state changes of the user 102(1) who is leading the directed interaction may expire after the conclusion of the regularly scheduled class time.

Block 1208 configures the participant 110 device 104 with at least a portion of the device configuration data, such that the device state changes from a first device state to a second device state. For example, the device configuration data may specify that user task switching between application modules 118 is disallowed.

In some implementations the device state may include operating system state information. The operating system may have a first operating system state enabling switching of application focus between a plurality of executing application modules 118 based on user input to the device 104. For example, the user 102 may be able to use the user interface 106 to switch between different application modules 118.

The participant setting data 130 may be configured to set the operating system to a second operating system state which disables switching of application focus between the plurality of executing applications based on user input to the device 104.

Block 1210 generates the participant status data 132, as described above. Block 1212 sends the participant status data 132 to the device management module 128 of the management server 114. As described above, in other implementations, the device management module 128 may execute at least in part on one or more of the management server 114 or the device 104.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
a device management server comprising:
a first communication interface;
a first memory storing first computer-executable instructions; and
a first processor configured to couple to the first communication interface, access the first memory, and execute the first computer-executable instructions to:
receive, using the first communication interface, presenter data from one or more presenter devices, wherein the presenter data comprises one or more of:
application configuration data indicative of one or more state settings of one or more applications executing on the one or more presenter devices; or
device configuration data designating one or more device settings of the one or more presenter devices;
generate, based at least in part on the presenter data, participant setting data wherein the participant setting data is configured to, when processed by a participant device, cause the participant device to modify one or more of:
one or more application states of the participant device, or
one or more device states of the participant device;
send, using the first communication interface, the participant setting data to one or more participant devices; and
receive, using the first communication interface, participant status data from the one or more participant devices.

2. The system of claim 1, wherein the one or more application states comprise one or more of:
a reference to a piece of content,
a location within a piece of content,
a uniform resource locator, or
a uniform resource identifier; and
wherein the one or more device states comprise one or more of:
a user permission state, enabling a user to switch between two or more executing applications,
audio output settings,
power state of one or more components of the presenter device, or
a user input state enabling acceptance of user input from one or more user input devices.

3. The system of claim 1, wherein the generating the participant setting data is based at least in part on one or more characteristics of the participant device, such that the participant setting data is configured to be processed by a particular make, model, or version of the participant device.

4. The system of claim 1, the presenter device comprising:
a second communication interface;
a second memory storing second computer-executable instructions; and
a second processor configured to couple to the second communication interface, access the second memory, and execute the second computer-executable instructions to:
generate the presenter data;
send, using the second communication interface, the presenter data to the device management server; and
receive, using the second communication interface, at least a portion of the participant status data from the device management server.

5. The system of claim 4, the participant device comprising:
a third communication interface;
a third memory storing third computer-executable instructions; and
a third processor configured to couple to the third communication interface, access the third memory, and execute the third computer-executable instructions to:

receive, using the third communication interface, the participant setting data from the device management server;

based on the participant setting data, modify one or more of:
 an application state of one or more applications stored in the third memory and configured for execution on the third processor, or
 a device state of the participant device;

generate the participant status data; and send, using the third communication interface, the participant status data to the device management server.

6. The system of claim 5, wherein the participant device further comprises one or more user input devices; and
 wherein the third computer-executable instructions are further configured to:
  enable acceptance of user input from the one or more user input devices,
 wherein the acceptance is constrained by the participant setting data.

7. The system of claim 5, wherein one or more of the presenter device or the participant device comprise a smartphone, electronic book reader device, tablet computer, laptop computer, or wearable computer.

8. A method comprising:
 accessing presenter data, the presenter data comprising one or more of:
  application configuration data indicative of one or more state settings of one or more applications; or
  device configuration data designating one or more device settings;
 generating participant setting data based on the presenter data, wherein the participant setting data is configured to, when processed by a participant device, cause the participant device to modify one or more of:
  one or more application states of the participant device, or
  one or more device states of the participant device; and
 sending the participant setting data to one or more participant devices.

9. The method of claim 8, further comprising:
 determining a device type of the participant device, wherein the device type is indicative of one or more of hardware, operating system, or application installed on the participant device;
 selecting a mapping between the presenter data and the participant setting data using the device type; and
 wherein the generating the participant setting data is further based on the mapping.

10. The method of claim 8, wherein the one or more state settings of the one or more applications designate one or more of:
 an application focus,
 an application to execute,
 a portion of content to present, or
 a user interface configuration.

11. The method of claim 8, wherein the one or more device settings designate one or more of:

enabling or disabling specific hardware of the device,
setting a display mode on a display device,
setting an audio output level of an audio output device, or
enabling or disabling task switching in an operating system.

12. The method of claim 8, further comprising:
 receiving the presenter data from one or more presenter devices;
 associating the presenter data with the one or more participant devices; and
 wherein the sending the participant setting data is based on the association.

13. The method of claim 8, further comprising:
 receiving, from at least one of the one or more participant devices, participant status data comprising data indicative of one or more of an application state or a device state of the participant device; and
 sending the participant status data to the one or more presenter devices.

14. The method of claim 8, wherein one or more of the presenter data, or the participant setting data comprise one or more key-value pairs, wherein at least one key-value pair is associated with an application state setting or a device setting.

15. A method comprising:
 accessing presenter data indicative of a first application state of an application executing on a device;
 generating participant setting data based on the presenter data, the participant setting data configured to set the application to the first application state; and
 providing the participant setting data to the device, wherein the device is executing the application in a second application state and the participant setting data causes the device to set the application to the first application state.

16. The method of claim 15, wherein the first application state comprises a first uniform resource locator, and the second application state comprises a second uniform resource locator.

17. The method of claim 15, wherein the second application state comprises an operating system state enabling switching of application focus between a plurality of executing applications based on user input to the device; and
 the first application state disables switching of application focus between the plurality of executing applications based on user input to the device.

18. The method of claim 15, further comprising receiving participant status data indicative of state data of the application.

19. The method of claim 15, wherein the participant setting data is configured to cause the device to return the application to the second application state after a predetermined period of time has elapsed.

20. The method of claim 15, further comprising accessing one or more mappings between elements of presenter data and corresponding elements of participating setting data, wherein the participating setting data is generated based at least in part on the one or more mappings.

* * * * *

UNITED STATES PATENT AND TRADEMARK OFFICE
CERTIFICATE OF CORRECTION

| | | |
|---|---|---|
| PATENT NO. | : 9,571,554 B1 | Page 1 of 1 |
| APPLICATION NO. | : 13/890947 | |
| DATED | : February 14, 2017 | |
| INVENTOR(S) | : David Mayr Lerner et al. | |

It is certified that error appears in the above-identified patent and that said Letters Patent is hereby corrected as shown below:

On the Title Page

Under (56) References Cited - U.S. Patent Documents the following cited patent should be added:
8,887,262 B1*  11/2014  Turner et al. .................... 726/10

Signed and Sealed this
Sixth Day of June, 2017

Michelle K. Lee
*Director of the United States Patent and Trademark Office*